H. C. MILLER.
LOCKING DEVICE FOR STEERING WHEELS.
APPLICATION FILED JAN. 31, 1920.
1,346,837. Patented July 20, 1920.
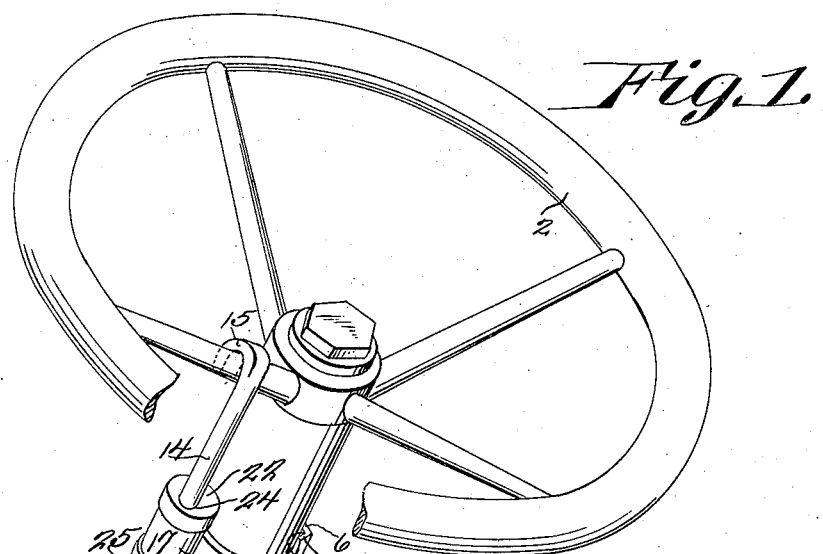
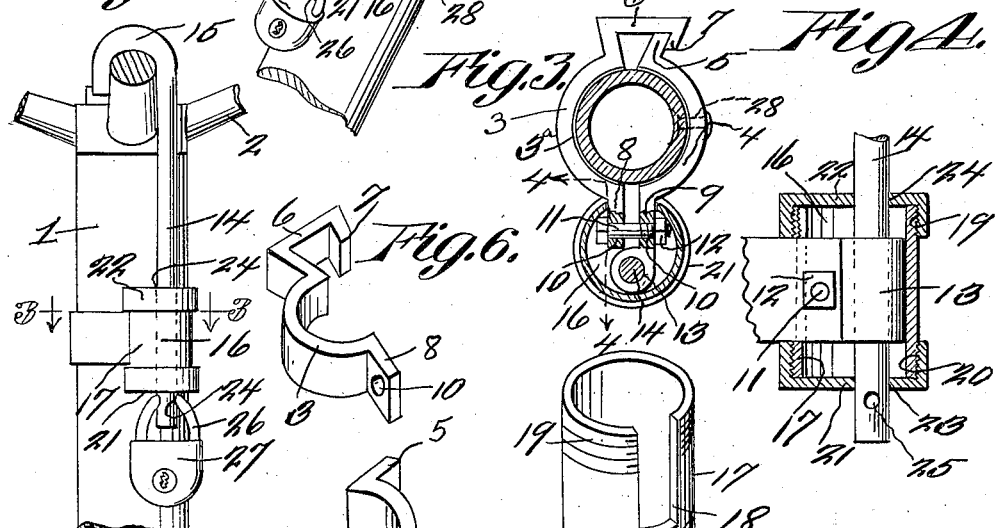
Inventor
H. C. Miller,
By Watson E. Coleman.
Attorney

UNITED STATES PATENT OFFICE.

HIRAM C. MILLER, OF PARKESBURG, PENNSYLVANIA.

LOCKING DEVICE FOR STEERING-WHEELS.

1,346,837.　　　　　Specification of Letters Patent.　　Patented July 20, 1920.

Application filed January 31, 1920. Serial No. 355,483.

*To all whom it may concern:*

Be it known that I, HIRAM C. MILLER, a citizen of the United States, residing at Parkesburg, in the county of Chester and State of Pennsylvania, have invented certain new and useful Improvements in Locking Devices for Steering-Wheels, of which the following is a specification, reference being had to the accompanying drawings.

This invention relates to an improved locking device especially adapted for automobile steering wheels, and an object of the invention is to improve and render more efficient and practical the locking device disclosed in the Patent #1,303,354, issued to Hiram C. Miller on May 13, 1919.

In the aforesaid patent it has been found possible to remove the nuts or the bolts 10 of the clamp 8 and thereby detach the lock, permitting the use of the steering wheel.

Therefore, it is a further object of the present invention to provide an improved clamp consisting of opposed clamping members having certain of their ends overlapped to form a connection, and a housing for the other bolted ends of the clamps, thereby preventing access to the bolted ends in order to prevent the removal of the clamps.

A further object is the provision of a locking member or key to extend through an opening in one of the bolted ends of one of the clamps and through the housing, eccentrically thereto, thereby preventing the removal of the caps of the housing from being unscrewed, until the padlock at the lower end of the locking element or key is detached.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of an automobile steering wheel showing the improved locking device as applied thereto, Fig. 2 is a view in elevation of the steering column, showing the clamping members of the locking element and the housing for a portion of the locking element, and illustrating the locking element hooked over one of the spokes of the steering wheel, Fig. 3 is a cross sectional view on line 3—3 of Fig. 2, Fig. 4 is a sectional view on line 4—4 of Fig. 3, Fig. 5 is a detail perspective view of the cylindrical housing, Fig. 6 is a detail perspective view of one of the clamps, Fig. 7 is a detail perspective view of the other clamp, and Fig. 8 is a detail view of one of the caps of the housing.

Referring more especially to these drawings, 1 designates a conventional form of steering column, showing the same equipped with the usual steering wheel 2. A pair of clamping members 3 and 4 are arranged to engage the steering column 1, therefore the clamps are semi-circular in construction. The clamp 4 has an angular end 5 which extends at an angle to the center of the steering column. The clamp 3 at one end is provided with an angular hook 6 overlying the angular end 5, and its terminal is provided with an angular portion 7 extending correspondingly to and engaging the angular end 5 of the clamp 4, thereby connecting the clamps. The other ends of both clamps terminate in parallel parts 8 and 9 which are provided with axially alined openings 10 for the reception of the bolt 11. This bolt 11 is provided with a nut 12, whereby the two parallel parts 8 and 9 can be drawn toward each other to tighten the clamps 3 and 4 on the column. The tighter the parallel parts 8 and 9 are drawn, the tighter the connections between the angular ends 5 and 7, thereby causing the clamps to firmly engage the column. The parallel part 9 of the clamp 4 terminates in an eye 13, through which the locking element 14 passes. The upper end of the locking element 14 terminates in a hook 15 adapted to overlie and engage one of the spokes of the steering wheel.

In order to protect and house the eye 13 and to prevent tampering with the bolt 11, a housing 16 is provided. This housing comprises a cylindrical shell 17 provided with a longitudinal slot 18. The shell 17 is open at both ends, and is also exteriorly threaded as indicated at 19 and 20. In order to apply the housing, the shell 17 is first fitted over the parallel parts 8 and 9, so that the slot 18 will receive the parts 8 and 9, at the point where they merge from the clamps 3 and 4. Suitable caps 21 and 22 interiorly threaded as shown engage the threads 19 and 20, thereby closing the opposite ends of the shell 17. These caps 21 and 22 have openings 23 and 24. Before the locking element is applied, the caps 21 and 22 are applied to the shell, and are adjusted tight enough on the shell and until the openings 23 and 24 are axially alined with each other and with the eye 13. After so arranging the caps with their openings in registration with the eye, the locking element is inserted through the housing and through the eye and the hook 15 is disposed in engagement with one of the spokes of the steering wheel. The locking element 14 near its lower end has an opening 25 which is so positioned as to be immediately under the lower cap 21 of the housing, and is adapted to receive the shackle 26 of a padlock 27. Owing to the opening 25 being immediately under and adjacent the lower surface of the lower cap 21 of the housing, the shackle 26 will assume a position under the lower cap and prevent upward movement of the locking element, thereby preventing the hook 15 from being disengaged from the spoke of the steering wheel.

In order to prevent movement of the clamps 3 and 4, and consequently prevent movement of the locking element, the clamp 4 is riveted as at 28 to the wall of the steering column thereby preventing any unauthorized person from using a hammer to knock the clamps upward toward the steering wheel so that the hook 15 could be disengaged from one of the spokes of the steering wheel. By this construction it will be noted that the steering wheel 2 is positively locked as there is no way of disengaging the hook 15 unless the padlock is first detached from the lower end of the locking element.

As shown in Fig. 3, fillers 3ᵃ substantially semi-circular, may be employed between the clamping members and the steering column, whereby the clamping members may be adapted to fit columns of different diameters.

The invention having been set forth, what is claimed as new and useful is:—

1. The combination with a steering column having a steering wheel on its upper end, of opposed clamps engaging the steering column and having certain of their ends bolted together, one of the bolted ends having an eye, a locking element having a hook at its upper end engaging one of the spokes of the steering wheel and passing downwardly through the eye, a housing inclosing the eye and the bolted ends of the clamps, and through which the locking element passes, and a padlock carried by the lower end of the locking element, thereby preventing upward movement of the locking element.

2. The combination with a steering column having a steering wheel at its upper end, of a clamp fixedly carried by the column and having bolted ends, one of which being provided with an eye, a housing inclosing the bolted ends and said eye and being disposed eccentrically to the eye, a locking element having a hook at its upper end engaging one of the spokes of the steering wheel, said element extending through the eye and passing eccentrically through the housing, and means carried by the lower end of the locking element immediately under the housing to prevent upward movement of the locking element.

3. The combination with a steering column having a steering wheel on its upper end, of a clamp fixedly carried by the column and comprising two opposing parts having certain of their ends over-hooked, certain other of their ends bolted together, one of said bolted ends having an eye, a housing inclosing the eye and said bolted ends and having eccentrically arranged openings at its opposite ends axially concentric with the eye, a locking element passing through the openings of the housing and through the eye and having a hook at its upper end to engage one of the spokes of the steering wheel, and means carried by the lower end of the element engaging immediately under the lower end of the housing to prevent movement of the locking element.

4. The combination with a steering column having a steering wheel on its upper end, of a clamp fixedly carried by the column and having detachably connected end parts, one of said connected end parts having an eye, a housing eccentric to and housing the eye, and the detachable connected end parts, a locking element extending through the eye and disposed eccentrically through the housing and provided with means at its upper end to engage one of the spokes of the steering wheel, and a device carried by the lower end of the locking element engaging immediately under the lower end of the housing to prevent upward movement of the locking element.

5. The combination with a steering column having a steering wheel on its upper end, of a clamp fixedly carried by the column and having detachably connected end parts, one of said connected end parts having an eye, a housing eccentric to and housing the eye, and the detachable connected end parts, a locking element extending through the eye and disposed eccentrically through the housing and provided with means at its upper end to engage one of the spokes of the steering wheel, and a device carried by the lower end of the locking element engaging immediately under the lower end of the housing to prevent upward movement of the locking element, said housing comprising a cylindrical shell provided with normally opened ends and having a longitudinally extending slot open at one end and adapted to straddle the connected parts of the clamp, and coöperating means for the opposite ends of the shell through which the locking element eccentrically passes.

In testimony whereof I hereunto affix my signature.

HIRAM C. MILLER.